(No Model.)

S. McKENNA.
SEPARATING MACHINE.

No. 266,857. Patented Oct. 31, 1882.

WITNESSES

INVENTOR

UNITED STATES PATENT OFFICE.

SAMUEL McKENNA, OF MEMPHIS, TENNESSEE.

SEPARATING-MACHINE.

SPECIFICATION forming part of Letters Patent No. 266,857, dated October 31, 1882.

Application filed April 10, 1882. (No model.)

*To all whom it may concern:*

Be it known that I, SAMUEL McKENNA, of Memphis, Shelby county, Tennessee, have invented certain new and useful Improvements in Grain Separating and Cleaning Machines, of which the following is a specification.

Figure 1:
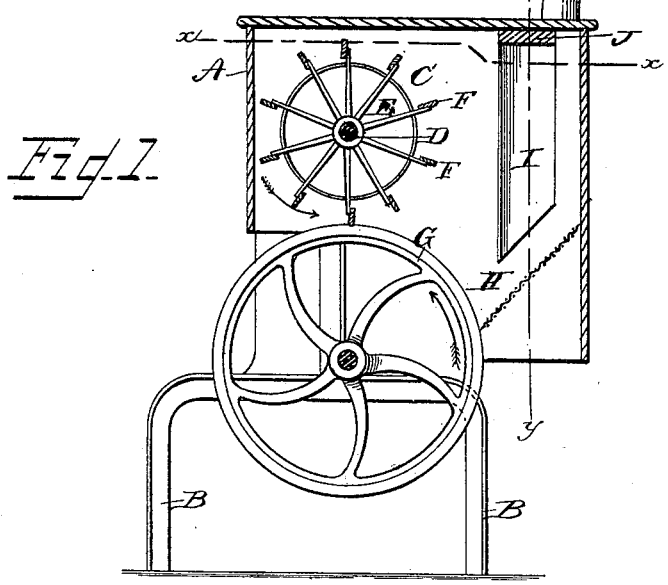
Figure 2:
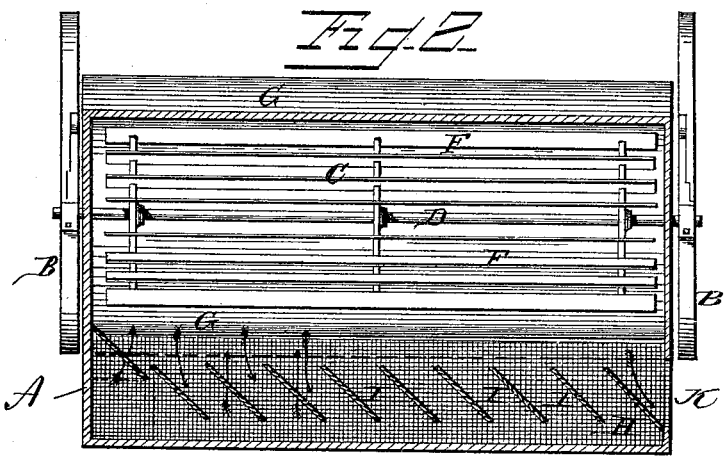
Figure 3:
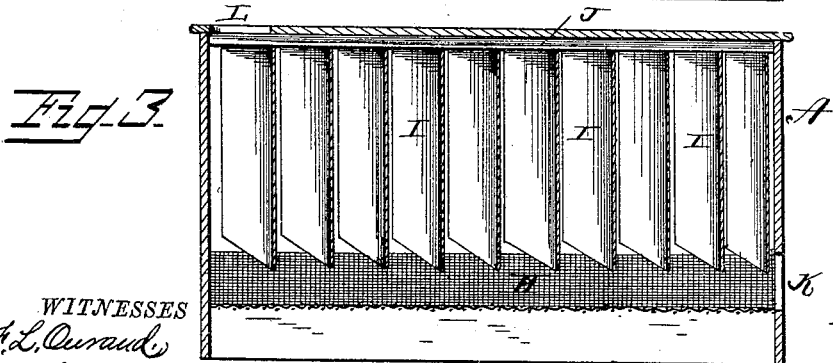

Figure 1 is a transverse sectional view of the machine. Fig. 2 is a horizontal sectional view on the line $x\,x$, Fig. 1; and Fig. 3 is a vertical longitudinal sectional view on the line $y\,y$, Fig. 1.

A designates the casing, which is mounted on legs or supports B B and carries a rotary beater, C, consisting of a shaft, D, having radial spokes E, which are provided with longitudinal strips F.

Underneath beater C is arranged a cylinder, G, adapted to rotate in a direction contrary to that of the beater.

H is an inclined screen arranged in front of the cylinder G, and, together with the latter, constituting the bottom of the casing A. Over screen H is arranged a series of vertical plates or deflectors, I, disposed at an angle to the beater, and depending from a cross-bar, J, at the top.

At the end of the series I is provided an exit-opening, K, an entrance-opening, L, being formed at the opposite end.

M is a curved spout at the top of the casing, through which the dust, &c., is blown after using.

The operation and advantages of my invention will be readily understood. The grain is fed to the machine at L, whence it falls on the inclined screen H, and passes down the same onto the rotary cylinder G, which carries it until it is caught up by the beater and thrown back against the first deflector I, the angular arrangement of which carries the grain in the direction shown by the arrows—*i. e.*, toward the end of the casing having the exit-opening K. The grain then again falls onto the screen, and is carried by the cylinder until it is driven by the beaters back against the next deflector, which carries the grain that much farther toward the end. This movement serves to thoroughly clean the grain, and is continued until all the deflectors have been passed, when the husks, stems, &c., are blown out at opening K, the cleansed grain being discharged through the screen. The machine is driven by suitable belt or pulley power applied to bandwheels on the shafts of the cylinder and beater.

My machine can be readily adapted to cleaning cotton or to hull grain or pulverize a material, slight changes being of course made in construction.

I claim as new—

1. The combination of the casing, a rotary cylinder, an oppositely-rotating beater, an inclined screen or platform, and a series of upright plates or deflectors disposed at an angle to the beater, as set forth.

2. The combination of the casing, a rotary cylinder, an oppositely-rotating beater, inclined screen, entrance-opening at one end and exit-opening at the other, and a series of upright plates or deflectors disposed at an angle to the beater and arranged on a cross-bar at the top of the casing, as set forth.

SAMUEL McKENNA.

Witnesses:
R. F. MORRISSY,
MEREDITH YATES.